US 6,701,962 B2

(12) United States Patent
Latino et al.

(10) Patent No.: US 6,701,962 B2
(45) Date of Patent: Mar. 9, 2004

(54) STACKABLE VALVE MANIFOLD ARRANGEMENT

(75) Inventors: Frank Latino, Setauket, NY (US); Grzegorz Bogdanowicz, Ostfildern (DE); Karl-Heinz Forster, Smithtown, NY (US)

(73) Assignee: Festo Corporation, Hauppauge, NY (US)

( * ) Notice: Subject to any disclaimer, the term of this patent is extended or adjusted under 35 U.S.C. 154(b) by 168 days.

(21) Appl. No.: 10/124,894

(22) Filed: Apr. 18, 2002

(65) Prior Publication Data

US 2002/0174905 A1 Nov. 28, 2002

Related U.S. Application Data

(60) Provisional application No. 60/285,574, filed on Apr. 20, 2001.

(51) Int. Cl.$^7$ ................................. F17D 1/00
(52) U.S. Cl. ..................................... 137/884
(58) Field of Search ................... 137/271, 884

(56) References Cited

U.S. PATENT DOCUMENTS

| | | | |
|---|---|---|---|
| 4,082,324 A | | 4/1978 | Obrecht |
| 5,582,209 A | * | 12/1996 | Borbone ..................... 137/884 |
| 5,605,179 A | * | 2/1997 | Strong, Jr. et al. .......... 137/884 |
| 6,325,104 B1 | * | 12/2001 | Yamashita ................... 137/884 |
| 6,354,329 B1 | * | 3/2002 | Kuther et al. ............... 137/884 |
| 6,356,823 B1 | * | 3/2002 | Iannotti et al. .............. 137/884 |

OTHER PUBLICATIONS

PC104.COM Internet Website. PC/104 Supplier Link Page.
FESTO Brochure "New. MH . . . 1 miniature valves" undated.
FESTO Catalogue "CP Valve Terminals", pp. 1–16, undated.
FESTO Catalogue "New: MHE–2 . . . fast switching valves", pp 5–9, undated.
FESTO Catalogue "ISO standard valves", pp. 2, 7 and 8, undated.

* cited by examiner

Primary Examiner—John Fox
(74) Attorney, Agent, or Firm—Hoffmann & Baron, LLP

(57) ABSTRACT

A stackable valve manifold arrangement including a first valve manifold adapted to operatively receive a plurality of valves. The first valve manifold having an upper surface. A second valve manifold is provided which is adapted to operatively receive a plurality of valves. The second valve manifold has a lower surface that is in opposed relationship to the upper surface of the first valve manifold, and the second valve manifold is in fluid communication with the first manifold. The first and second manifolds may each be joined to a circuit board forming a module. The modules are vertically stackable and operatively connected to each other to form a system.

31 Claims, 10 Drawing Sheets

STACKABLE VALVE MANIFOLD ARRANGEMENT

This application claims priority to U.S. provisional application 60/285,574 filed Apr. 20, 2001, the disclosure of which is incorporated herein by reference.

FIELD OF INVENTION

The present invention relates to a stackable valve manifold arrangement. More specifically, the present invention relates to a stackable valve manifold wherein a plurality of fluid power manifolds are vertically stacked and share common fluid power connections. The present invention further relates to a vertically stackable circuit board and manifold forming an electro-pneumatic module.

BACKGROUND OF THE INVENTION

In order to control machinery in the industrial or laboratory environment, it is well known to use electronically controlled fluid power valves and actuators. The valve actuating signals may be generated by analog relay logic or by a digital controller. In certain applications it is desirable to drive a series of valves by way of an I/O circuit board, or other board which is part of a control system.

Circuit boards may be configured to conform with a particular established standard so that they will be compatible physically and electronically with other circuit boards also conforming to that standard. One such standard is referred to as PC/104 and PC/104 Plus standard (referred to herein collectively as PC/104) which defines the mechanical and electrical specifications for a compact version of the IEEE P996 (PC and PC/AT) bus. This standard is optimized for unique requirements of embedded systems. One important benefit of this standard is the relatively small form factor and the use of a self-stacking bus which eliminates the need for backplanes or card cages. Circuit boards conforming to the PC/104 standard may be vertically stacked resulting in a compact design which is easily adaptable for integration into a piece of equipment. Many circuit boards are available on the market for performing a variety of functions including CPU, I/O and video controller functions. PC/104 based systems are used in a variety of applications including factories, laboratories, processing plants, vehicles, etc. A plurality of circuit boards may be stacked to provide a desired system. One such system is disclosed in U.S. Pat. No. 6,356,823. In addition to circuit boards conforming to the PC/104 standard, it is known to vertically stack other types of circuit boards both standardized and custom.

It is also well known to group electro-pneumatic valves together on a manifold and connect them to a circuit board or controller though a cable or connector. Such a manifold is disclosed in U.S. Pat. No. 5,490,385. Manifolds are typically longitudinally extending members including a plurality of valve stations to which valves may be secured. While manifolds of the prior art, such as U.S. Pat. No. 4,082,324, can be extended longitudinally to increase the number of valves that can be accommodated, they are not designed to be vertically stacked. Therefore, such manifolds are not suitable for use with vertically stacking circuit boards such as those conforming to the PC/104 standard.

Accordingly, it would be desirable to provide a fluid power manifold that may be fully integrated with vertically stacking circuit boards. It would be further desirable to provide an electro-pneumatic module that is vertically stackable to facilitate integration with a piece of equipment.

SUMMARY OF THE INVENTION

The present invention provides a fluid power manifold which can be vertically stacked.

The present invention also provides a stackable fluid power manifold supported on a circuit board forming an electro-pneumatic module.

The present invention further provides a stackable valve manifold including a first and second valve manifold secured to each other in a vertically stacked arrangement.

A preferred embodiment of the present invention includes a stackable valve manifold arrangement including a first valve manifold adapted to operatively receive a plurality of valves along a length thereof. The first valve manifold has a top portion extending longitudinally along the length of the first manifold. The top portion includes an upper surface and a valve base including a plurality of valve stations for accommodating the plurality of valves. The arrangement also includes a second valve manifold having a longitudinally extending top portion adapted to operatively receive a plurality of valves along a length thereof. The second valve manifold has a longitudinally extending lower surface. The second valve manifold is connected to the first valve manifold such that the lower surface of the second manifold is in opposed relationship to the top surface of the first valve manifold and the first manifold is in fluid communication with the second manifold.

The upper surface of the first manifold and the lower surface of the second manifold may each include a pressure port which is operatively connected together. The upper surface of the first manifold and the lower surface of the second manifold may each include an exhaust port which is operatively connected together.

The first and second manifolds may each be secured to a printed circuit board. The circuit boards are electronically operatively connected to each other and adapted to electronically communicate with valves on the manifolds. The circuit board boards may include circuitry adapted to operate the valves.

The present invention may also provide a valve manifold arrangement including a first longitudinally extending valve manifold having an top portion including a plurality of valve stations adapted to operatively receive a plurality of valves. A first circuit board is secured to the first valve manifold forming a first module. The arrangement also includes a second longitudinally extending valve manifold adapted to operatively receive a plurality of valves. The second valve manifold having a lower surface. A second circuit board is secured to the second valve manifold forming a second module. The second module is positioned above and opposed from the first circuit board and supported on the top portion of the first manifold. The first module is in electrical and fluid communication with the second module.

The present invention may further include a third circuit board electrically connected to the first and the second circuit boards. The third circuit board being supported on the second circuit board. The third circuit board may include a microprocessor adapted to receive input signals and generate output signals.

The present invention may further provide an electro-pneumatic stackable system including a first longitudinally extending valve manifold adapted to operatively receive a plurality of valves, the first valve manifold having an upper surface. A first PC/104 compatible circuit board is secured to the first valve manifold forming a first module. The system may further include a second longitudinally extending valve manifold adapted to operatively receive a plurality of valves. The second valve manifold has a lower surface that is in opposed relationship to the upper surface of the first valve manifold, wherein the second valve manifold is supported from below the first valve manifold and in fluid communication therewith. A PC/104 compatible second circuit board is secured to the second valve manifold forming a second module. A PC/104 CPU board is positioned adjacent one of the first and second modules and in electrical communication with the first and second modules. The CPU board generates signals to drive the plurality of valves.

The present invention still further provides a stackable valve manifold arrangement including a first and second valve manifold adapted to operatively receive a plurality of valves along a length thereof. The first and second valve manifolds have a top portion, a bottom surface and a front face extending longitudinally along the length of thereof. The front face is generally perpendicular to the top portion. The second manifold is stacked on top of the first manifold and in fluid communication therewith. The front face of the first and second manifolds include a plurality of valves stations adapted to receive the plurality of valves, such that the plurality of valves may be secured to and removed there from without separating the first manifold from the second manifold. The lower surface of the first and second manifolds define a recess for accommodating electrical connectors for the plurality of valves.

A preferred form of the present invention as well as other embodiments, objects, features and advantages of the invention will be apparent from the following detailed description of illustrative embodiments thereof which is to be read in conjunction with the accompanying drawings.

DETAILED DESCRIPTION OF THE PREFERRED EMBODIMENTS

Figure 1:
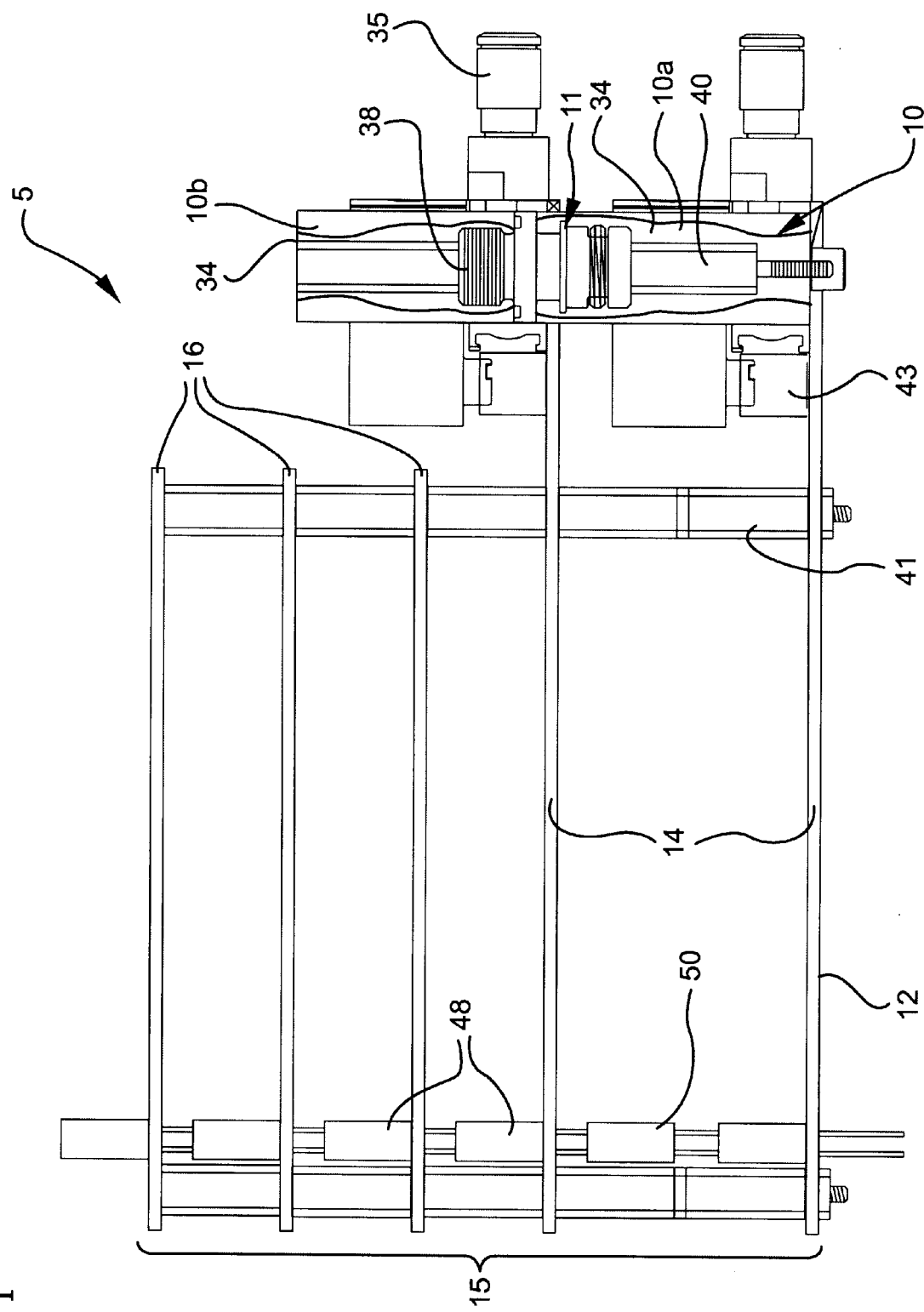
FIG. 1 is a side elevational view of the valve manifold arrangement of the present invention including a stacked electro-pneumatic module connected to additional stackable circuit boards forming a system with a portion of the valve manifolds removed for clarity.

The present invention provides a stackable valve manifold arrangement wherein a plurality of fluid power valve manifolds is vertically stacked and share common fluid power connections. The valve manifolds are compatible with vertically stackable printed circuit boards such as those conforming to the well known PC/104 and PC/104 Plus standard (referred to herein collectively as the PC/104). PC/104 defines the mechanical and electrical specifications for a compact version of the IEEE P996 (PC and PC/AT) bus, optimized for the unique requirements of embedded systems. The key benefits of this system include the small form factor (90 by 96 mm), and the elimination of back planes or board cages through a self-stacking bus.

The stackable valve manifold of present invention when mated with a circuit board that conforms to the PC/104 standard provides a module with fluid power components. Accordingly, the present invention further provides a stackable module conforming to the PC/104 standard which has fluid power controllers such as valves. While the manifold is particularly well suited to the PC/104 standard due to its ability to be vertically stacked, it is within the contemplation of the present invention that the manifold could be integrated with a wide variety of circuit boards both standardized and custom, which are stacked. The stackable valve manifold of the present invention may also be used separately from a circuit board in such situations where size constraints or other factors make stacking valves desirable.

The stackable valve manifold of the present invention takes advantage of the self-stacking bus of PC/104, which electrically self-stacks via connectors. By mounting the valve manifold on the printed circuit board, common pneumatic pressure and exhaust ports vertically align or self-stack. The advantage of this design is for a common pressure and exhaust to flow through to adjacent manifolds, allowing one connection for supply pressure and one connection for exhaust. In order to conform to PC/104 standard, the manifold may be sized to accommodate 8 valves of the type marketed by Festo Corporation known as MH-type Miniature Valves. However, this is not a limitation of the PC/104 capacity. For special applications, a higher number of valves are possible. In addition to the Festo valves, any number of well-known solenoid or otherwise electrically operated valves could be employed for use with the PC/104 compatible circuit board.

The present invention now provides an electro-pneumatic module, which can be used to operate fluid power machinery either directly or indirectly. The ability to generate a pneumatic signal is especially useful in hazardous environments where the risk of a spark must be eliminated.

Referring to FIGS. 1 through 4, the present invention the stackable valve manifold arrangement 5 of the present invention generally includes a stackable valve manifold 10 that is joinable with another stackable manifold 10 in a vertical manner forming a manifold assembly 11. Each manifold may also be joined to a printed circuit board 12 to form an electro-pneumatic module 14 which can be vertically stacked. In the preferred embodiment, module 14 conforms to the PC/104 standard, which permits its use with a variety of marketed electronic modules 16 such as CPU, I/O, video controllers, etc., to be stacked all together to form a compact system 15. The electro-pneumatic module of the present invention may be used in embedded systems for a wide variety of applications including process or machine control.

The manifolding of valves eliminates the need to fluidly connect each valve individually as the manifold provides common connections for such ports as pressure and exhausts. Accordingly, manifolds typically include a single connection for the common pressure supply line and another for the common exhausts. The present invention permits a plurality of manifolds 10 to be vertically stacked and to share a common pressure supply and exhaust ports.

Therefore, only one pressure supply line and one exhaust line need be connected to the assembly of stacked manifolds.

Figure 4:
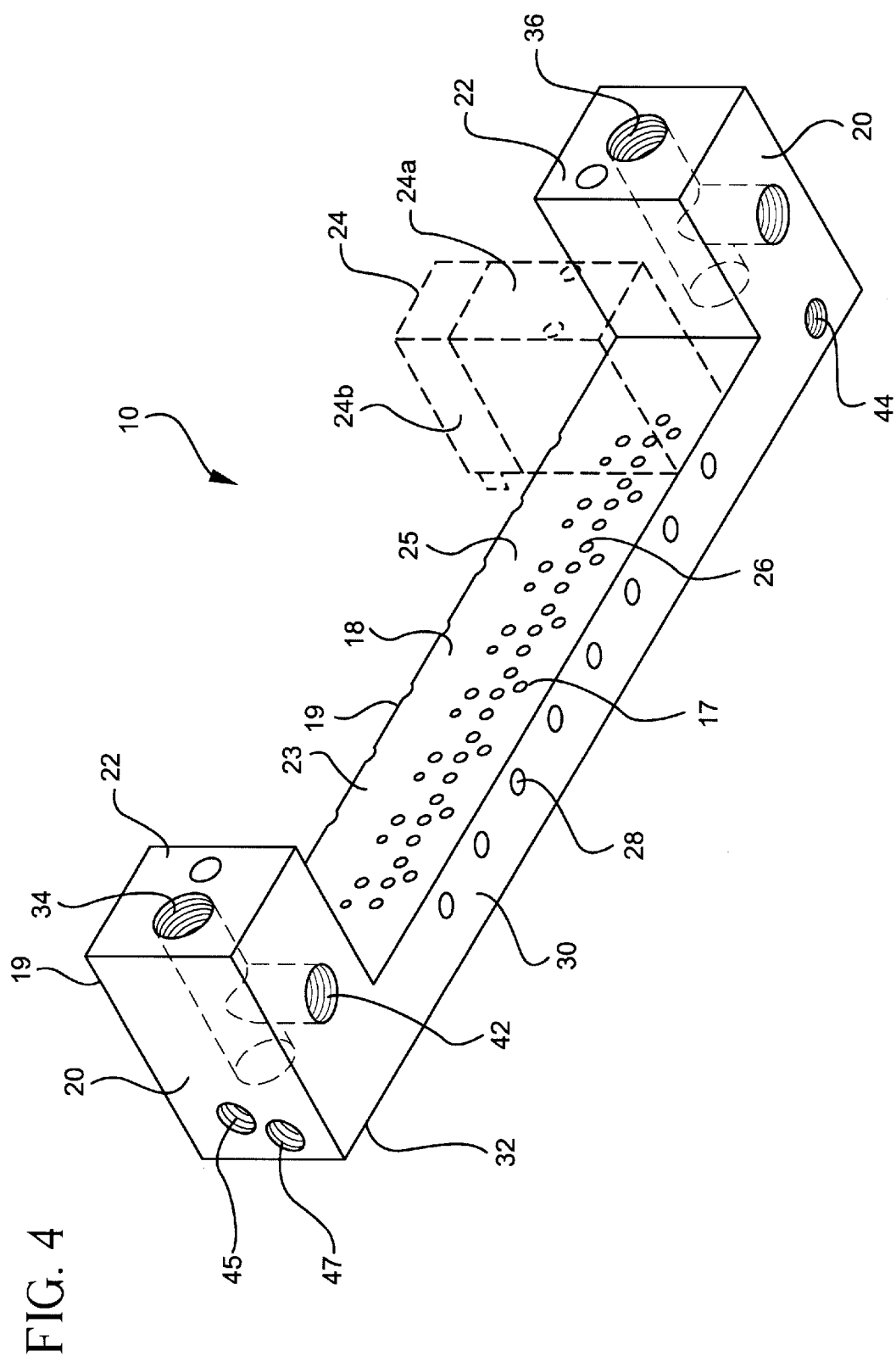
FIG. 4 is a top perspective view of the stackable valve manifold of the present invention.
Figure 7:
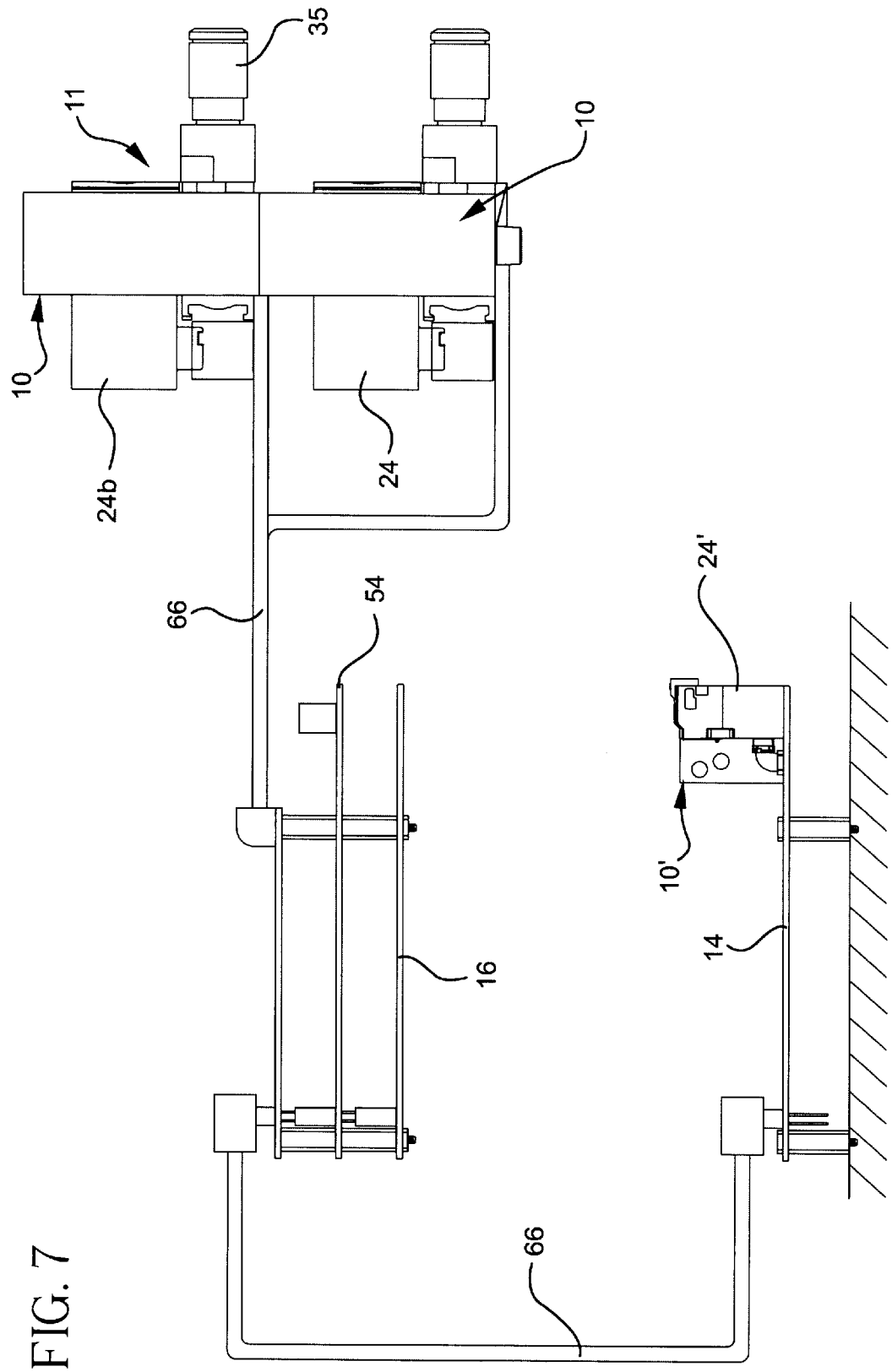
FIG. 7 is a side elevational schematic view of an electro-pneumatic module connected remotely to a field bus controller and a remotely controlled valve manifold arrangement.

With specific reference to FIG. 4, manifold 10 includes a plurality of valve stations 17 extending along the length of the manifold, to accommodate the mounting of a plurality of valves 24. Manifold 10 preferably has an elongated U-shaped configuration including a central portion 18 bounded by a pair of upstanding end posts 20. Manifold 10 includes a top portion 19 extending longitudinally along the manifold's length. The top portion 19 includes an upper surface 22 formed at uppermost part of end posts 20, and a valve base 23 formed on manifold central portion 18. Valve base 23 includes the plurality of valve stations 17 for receiving a plurality of fluid power valves 24. The bottom portion of manifold 10 includes a longitudinally extending lower surface 32. A plurality of manifolds 10 may be vertically stacked such that the lower surface 32 of a first manifold 10 may be in opposed relationship with the upper surface 22 of a second manifold upon which the first manifold is supported (FIGS. 1 and 7). The U-shaped configuration of manifold 10 creates a recess 25 bounded by posts 20 and the valve base 23 of central portion 18. Recess 25 permits the valves 24 to be nested therein and not protrude above upper surface 22 of the manifold. This configuration permits manifolds 10 to be physically and operatively connected when stacked.

Each valve station 17 includes a plurality of openings, or ports, 26 that correspond to openings on the body 24a of the valve. The particular opening configuration can be formed in any of a number of desired patterns to align with valve port openings of a specific valve. Working ports 28, from which the valve controlled air flows from the manifold, may be formed on the front face 30 of manifold 10 to permit the flow of air upon actuation of a valve. Working ports 28 may be threaded to receive a fitting 35, which would be attached to tubing and then a valve or actuator, in a manner well known in the art. Valves 24 may be each connected to a control signal either electrical or pneumatic to permit actuation of the valve 24.

Figure 2:
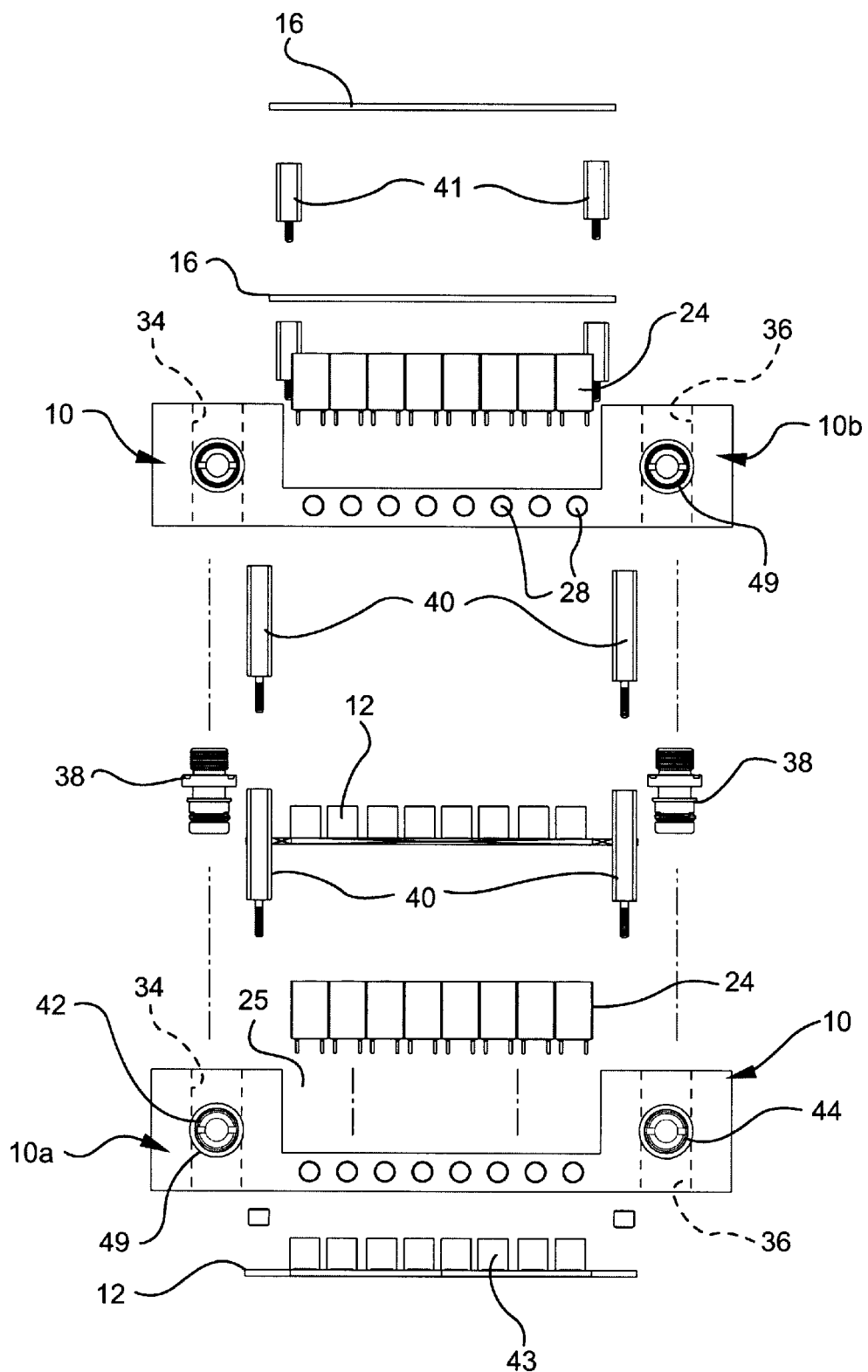
FIG. 2 is a front elevational exploded view of the valve manifold arrangement of FIG. 1.
Figure 3:
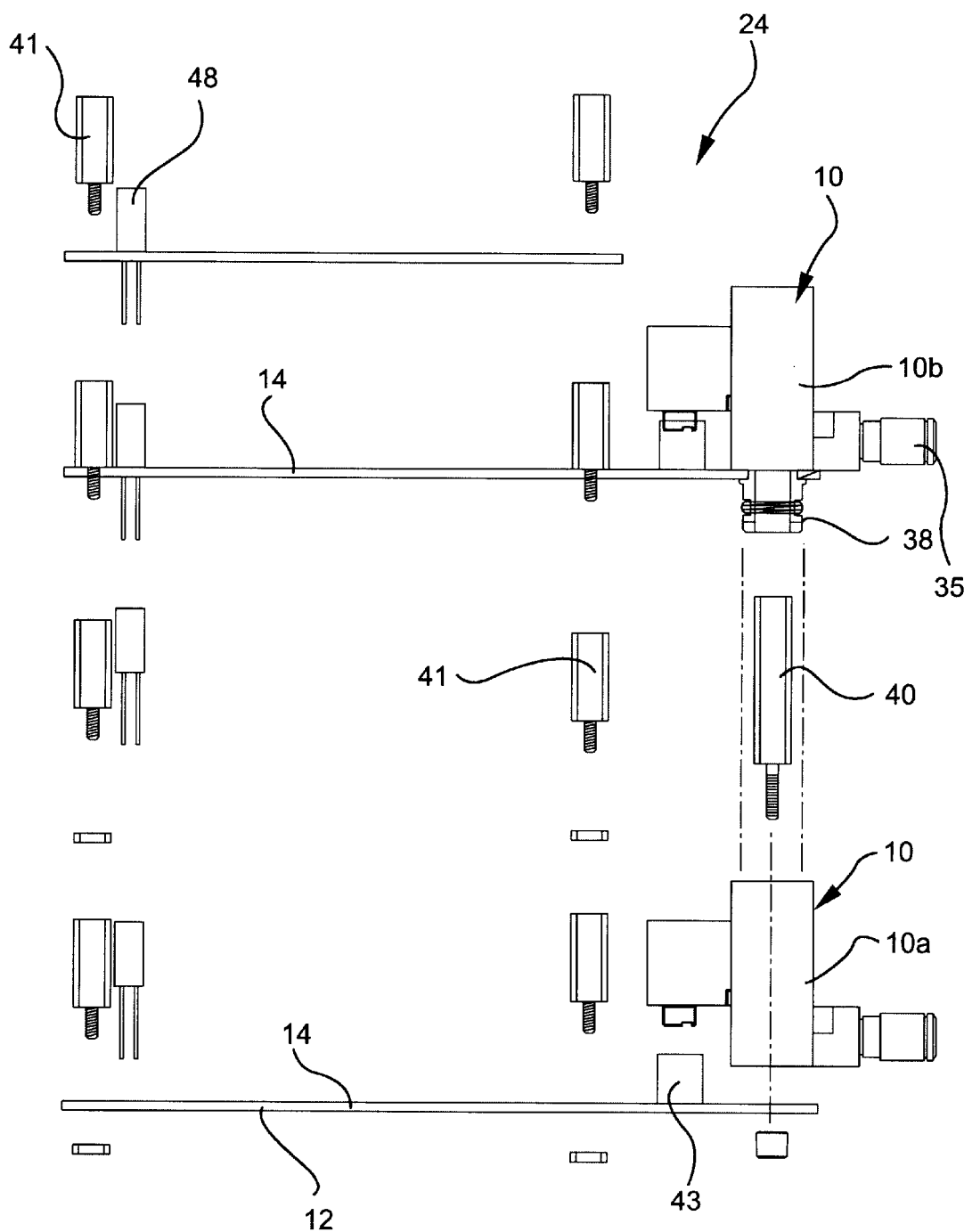
FIG. 3 is a side elevational exploded view of the valve manifold arrangement of FIG. 1.

As shown in FIGS. 1, 2 and 3, one manifold 10 may be placed above and secured to another manifold 10 in a stacked manner. Manifold 10 includes common pressure ports 34 and exhaust ports 36 which extend through end posts 20 between the upper 22 and lower 32 surfaces of manifold 10. Ports 34 and 36 are connected by transverse channels to the various valve stations. When manifolds are vertically stacked, the common ports 34 and 36 in the upper surface 22 of the lower manifold 10a align with corresponding common ports on bottom surface 32 of upper manifold 10b. Therefore, the common ports 34 and 36 can then be joined by couplers 38, thereby pneumatically coupling the common ports of each manifold in the stack. Couplings 38 may be threadedly coupled to the ports on the lower surface of the upper manifold 10b and sealingly received in the ports in the upper surface of the lower manifold 10a. Coupling 38 could also include a variety of sealing devices such as o-rings, lip seals or sealants. The pneumatically joined manifolds 10a and 10b may be secured to each other by threaded elongate fasteners 40. In this arrangement, the common ports on the lower surface of the lower manifold 10a may be plugged, as they are not needed. In order to supply pressure and remove exhaust to and from the stacked manifolds, connection ports 42 and 44 (FIGS. 2 and 4) may be disposed on manifold front face 30 and be in fluid communication with the common pressure 34 and exhaust 36 ports respectively. Only one of the plurality of stacked manifolds 10 needs to have their connection ports connected to tubing as the common pressure and exhaust ports of each stacked manifold will be operatively connected. Accordingly, any unused connection ports may be sealed with a plug 49. Also preferably sealed would be the exposed common ports on the upper surface of the upper manifold 10b. It is also within the contemplation of the present invention that the manifolds 10 could be connected to the common exhaust and pressure supplies by way of connection ports 34 and 36 (FIG. 4) on the upper or lower surface of the manifolds 10. Furthermore connection ports 45 and 47 could also be provided on the sides of manifold 10, with any unused port being sealed. In addition, a plurality of common pressure of exhaust ports could be connected to tubing or the like in order to increase the flow to or from the manifold assembly.

While each manifold in the stack may share common ports, the present invention permits the individual manifolds to be pneumatically isolated from one another, through plugging the aligned ports and tubing the manifolds individually. This may be desirable if the valves on one manifold are to be fed with a different supply pressure than the other valves on the manifold.

Manifold 10 is preferably formed of a corrosion resistant material such as aluminum but a variety of metals or polymer materials may be used. In order to direct the flow between the various ports and the valves, internal channels may be formed in the manifold in a manner well known in the art.

Figure 5:
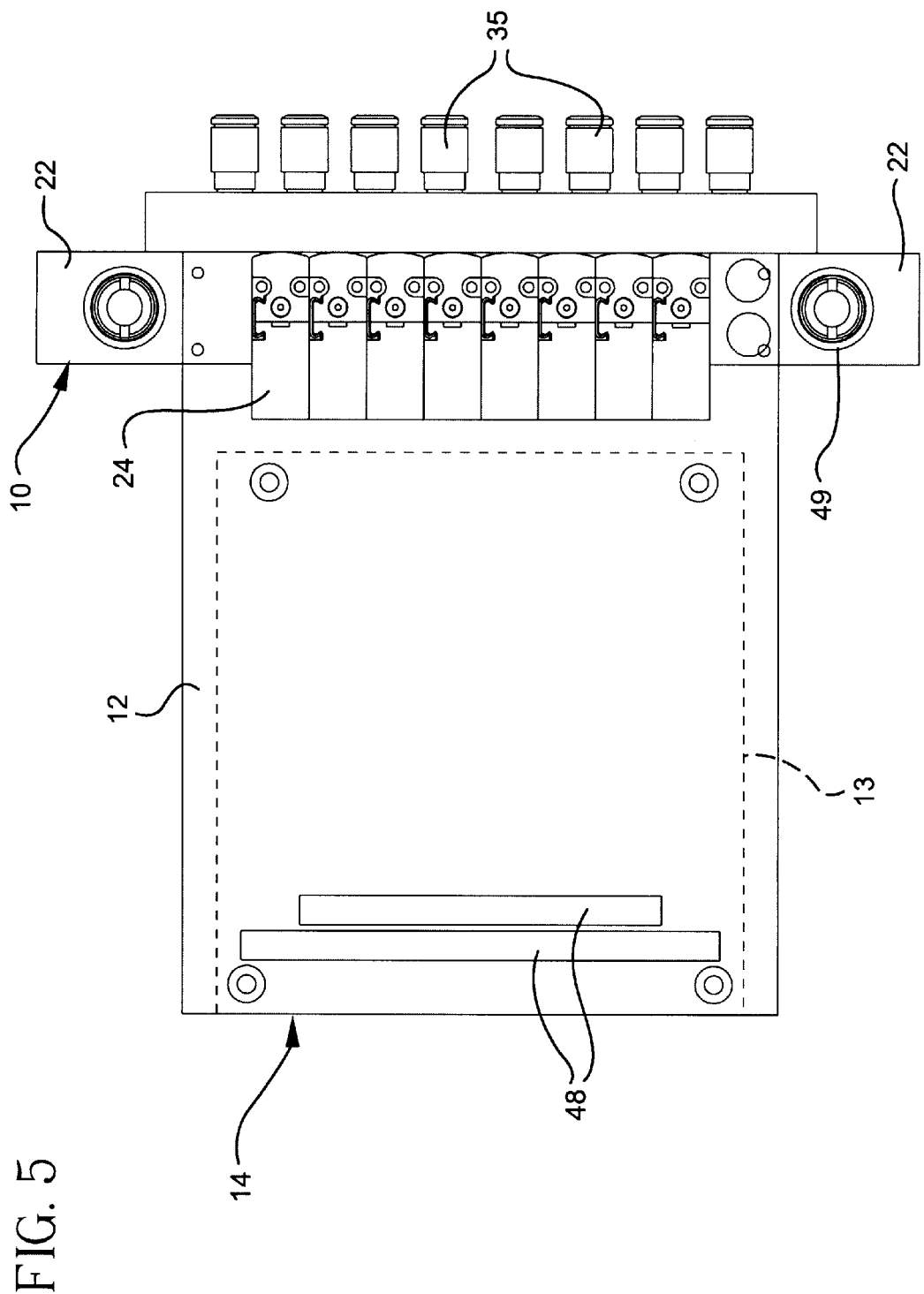
FIG. 5 is a top plan view of the electro-pneumatic module of the present invention.

The ability of manifold 10 to be vertically stacked makes it particularly suitable for integration with electronic circuit boards that are configured to be vertically stacked. Referring additionally to FIG. 5, manifolds 10 may be supported on a circuit board 12 to form an electro-pneumatic module 14. Manifold 10 may sit on top of its corresponding circuit board and be secured thereto. One module 14 may be positioned above and opposed from another module 14 and secured thereto in a vertically stacked manner. In this arrangement, the upper module is supported by the manifold of the bottom module. Clearance holes (not shown) may be formed near the edge of the circuit board to permit couplings 38 (FIG. 1) and fasteners 40 to extend between manifolds 10 when one electro-pneumatic manifold is vertically joined to another electro-pneumatic manifold. Valves 24 may be electrically connected to circuit board 12 by way of a plug-in type connector 43, thereby electrically integrating the valves with the circuit board. Module 14 preferably conforms to the PC/104 standard that provides for vertically stacking together a plurality of circuit boards to form a complete system. Each circuit board conforming to the PC/104 standard includes an electrical connector 48 on the top and bottom side, which may be operatively connected to an adjacent vertically aligned circuit board. Connection between adjacent circuit boards may be accomplished with standoffs 41 and electrical connectors 48. A connector bridge 50 may be employed to extend between the space between an electro-pneumatic module 14 and an adjacent circuit board (FIG. 1). Multiple electro-pneumatic modules 14 can be used in one system by individually addressing each module. In addition, referring to FIG. 1, electro-pneumatic modules 14 of the present invention may be combined with other circuit boards forming modules 16 in a vertically stacked manner.

While the stackable valve manifolds 10 lend themselves to be used with vertically stackable circuit boards, it is within the contemplation of the present invention that the valve manifolds 10 could be vertically stacked to form a manifold assembly 11 without the use of circuit boards as shown in FIG. 7. The valves could then be connected to individual connectors or to a single multi-pin connector such as that used with ribbon cable.

The present invention permits the integration of fluid power and electronic components in a compact vertically stacked arrangement which may be easily adapted for integration with a machine, instrument or control system. The electro-pneumatic module 14 of the present invention provides a compact design that can be easily assembled and integrated into a piece of equipment. The use of vertically stackable manifolds 10, permits a significant reduction in external pneumatic connection as only one common pressure line and one common exhaust line is needed to supply the various stacked manifolds and their valves.

In addition, by conforming to the P/C 104 standard, the stackable electro-pneumatic modules 14 of the present invention may be combined with other electronic modules 16 to form a complete system. Electronic modules 16 may be circuit boards of the type which conforms to the PC/104 standard. A wide variety of such modules are readily available and capable of performing functions such as CPU, I/O ports and video controllers. Such compatibility gives system designers many choices when designing a system, and reduces unnecessary board or circuit design.

The electro-pneumatic module 14 shown in FIG. 5 is PC/104 bus compatible permitting its use with other available modules conforming to the PC/104 standard. However electro-pneumatic module's physical dimensions may extend beyond the PC/104 form factor shown in dotted line 13. It is within the contemplation of the present invention that a number of miniaturized valves could be mounted within the footprint in order to produce a module fully PC/104 compliant. While the preferred embodiment includes an electro-pneumatic module 14 which conforms to the PC/104 standard, it is within the contemplation of the present invention that the circuit board may have a wide variety of configurations both standardized and custom. The circuit board may even be one which connects through a back plane connector, e.g., VME bus standard. Such a board configuration would permit the circuit boards and manifolds to be stacked with the boards being connected by a back plane.

Figure 6:
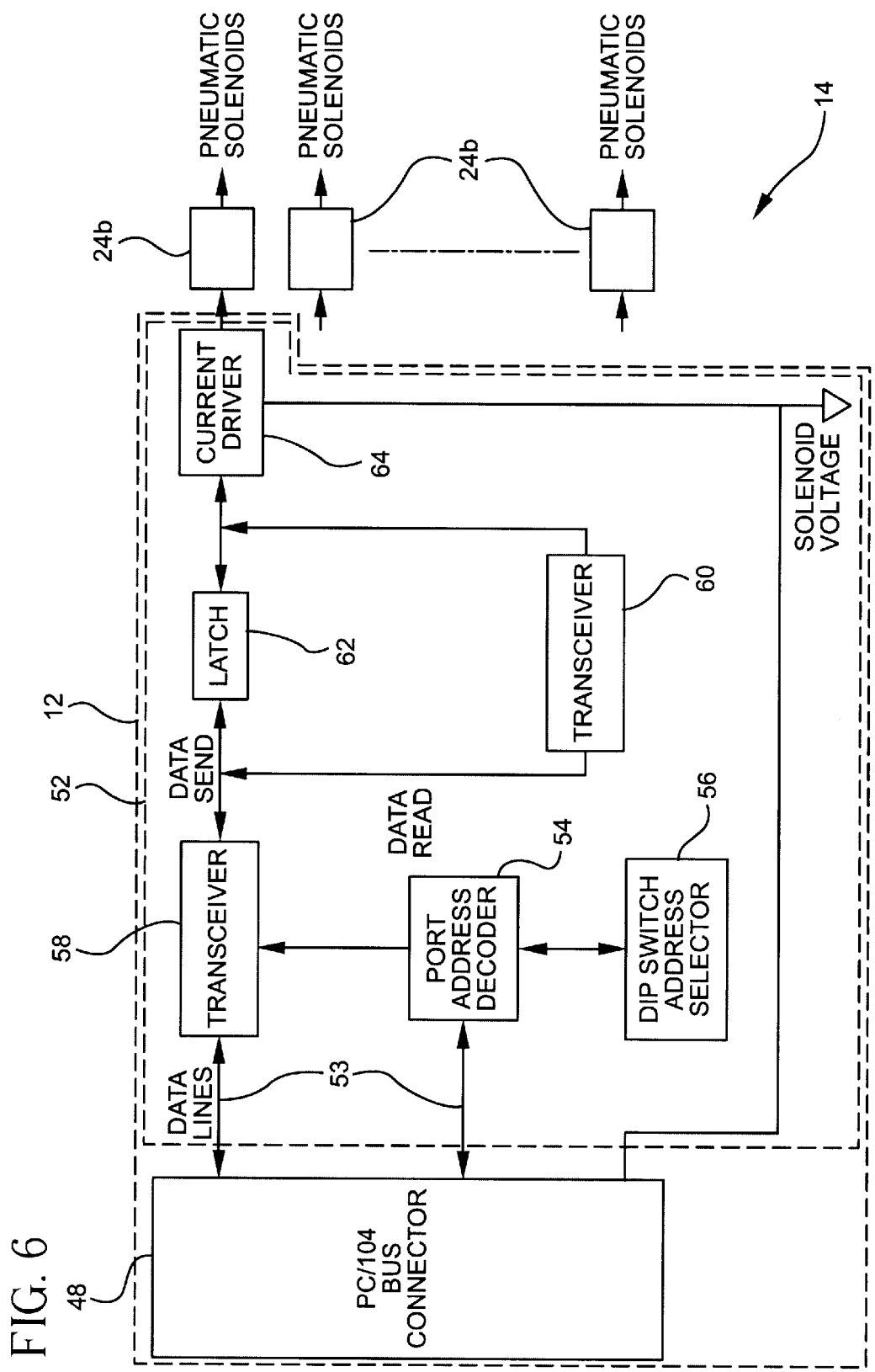
FIG. 6 is a circuit block diagram of a circuit board portion of an electro-pneumatic module of the present invention.

A circuit block diagram of a preferred form of electro-pneumatic module 14 is shown in FIG. 6. In the preferred embodiment, the address for each circuit board 12 is decoded from the PC/104 address bus. The data for controlling solenoids 24b is decoded from 8 or 16 bits from the PC/104 data bus. Since the data bus for PC/104 is bi-directional, sensor input circuitry or integrated manifold sensors, e.g., pneumatic flow, pneumatic pressure, electronic spool detection, etc., can be combined on circuit board 12, allowing a system developer to easily access diagnostic data for the electro-pneumatic module 14. Module 14 includes circuit board 12 having a PC/104 bus electrical connector 48 for connecting the board to an adjacent circuit board and the data bus. Module 14 also includes a valve actuation circuit 52 for transforming the information on the bus to valve actuation. Circuit 52 includes data lines 53 that lead from electrical bus connector 48 to port address decoder 54 and a DIP switch address selector 56 which permits the various modules 14 in a system to be individually addressed. Data sent by a CPU board, such as a PC motherboard or other circuit board or device having a processor, is processed by the port address decoder 54. If the selection of the port address from the CPU board matches the DIP switch address selector 56, port address decoder 54 enables a first transceiver 60, and controls direction of data on the individual circuit board 12. If the direction is from a "write" function of the CPU board, a latch 62 will retain the information passing through first transceiver 58 from the write function. Since all data is "clocked", a latch is allows the retention of the data. The latch 62 enables a current driver 64 to source only the valve solenoids 24b commanded in the write function. If the CPU board initiates a "read" function, the data from latch 62 is read through a second transceiver 58, back to the CPU board. The bus connector 48 also may include the option to provide solenoid power to supply the current driver, for actuating solenoid coils 24b. While a preferred embodiment is described, the present invention is not limited to such. As understood by one skilled in the art, the particular circuit design of module 14 may include a variety of components and circuitry in order to actuate the valves. For example, valve switching signals generated off the circuit board could be sent through bus connecter 48 directly to the valves 24.

Valves 24 preferably include actuation solenoids 24b, which are electrically connected to circuit board 12 via a connector 43. Solenoids 24b may draw power either 5 vdc or 12 vdc from the PC/104 bus, thereby eliminating multiple discrete power connections for each circuit board. Since the maximum current requirements for each PC/104 module are 1 amp at 12 vdc, or 2 amps at 5 vdc, the low current draw of Festo Miniature vales or their equivalent is suitable.

Solenoid valve control can be accomplished by standard current drivers for general use, or coupled with lockout circuitry for interlocks of the type used in the semiconductor industry and described in U.S. Pat. No. 6,041,415, the disclosure of which is herein incorporated by reference. The CPU board for the stacked modules 14 may be an embedded processor module for local control, but it is not limited to this. Alternatively, a field bus module may also be employed and included in the stacked system.

In an alternative embodiment shown in FIG. 7, electro-pneumatic modules 14 may stand-alone and be connected via an IDC (ribbon cable) connection 66 or its equivalent to a CPU board. Accordingly, one module 14 or an assembly of stacked modules 14 may be located away from the CPU board or other circuit boards which make up the system. In addition, a stacked valve manifold assembly 11 may be located off the circuit board and connected thereto via a cable.

Figure 8A:
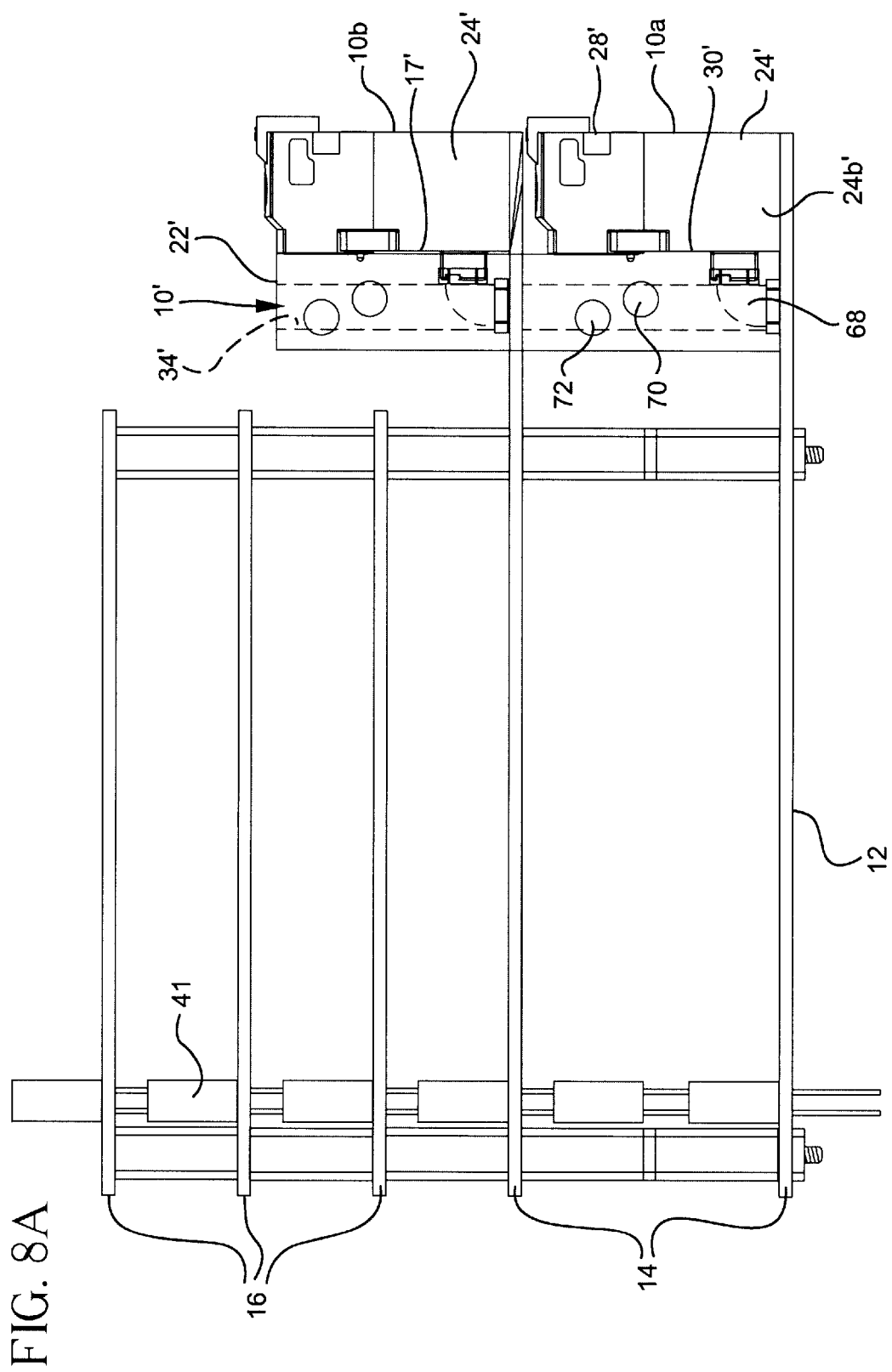
FIG. 8A is a side elevational view of a system including an alternative embodiment of the stackable valve manifold.
Figure 8B:
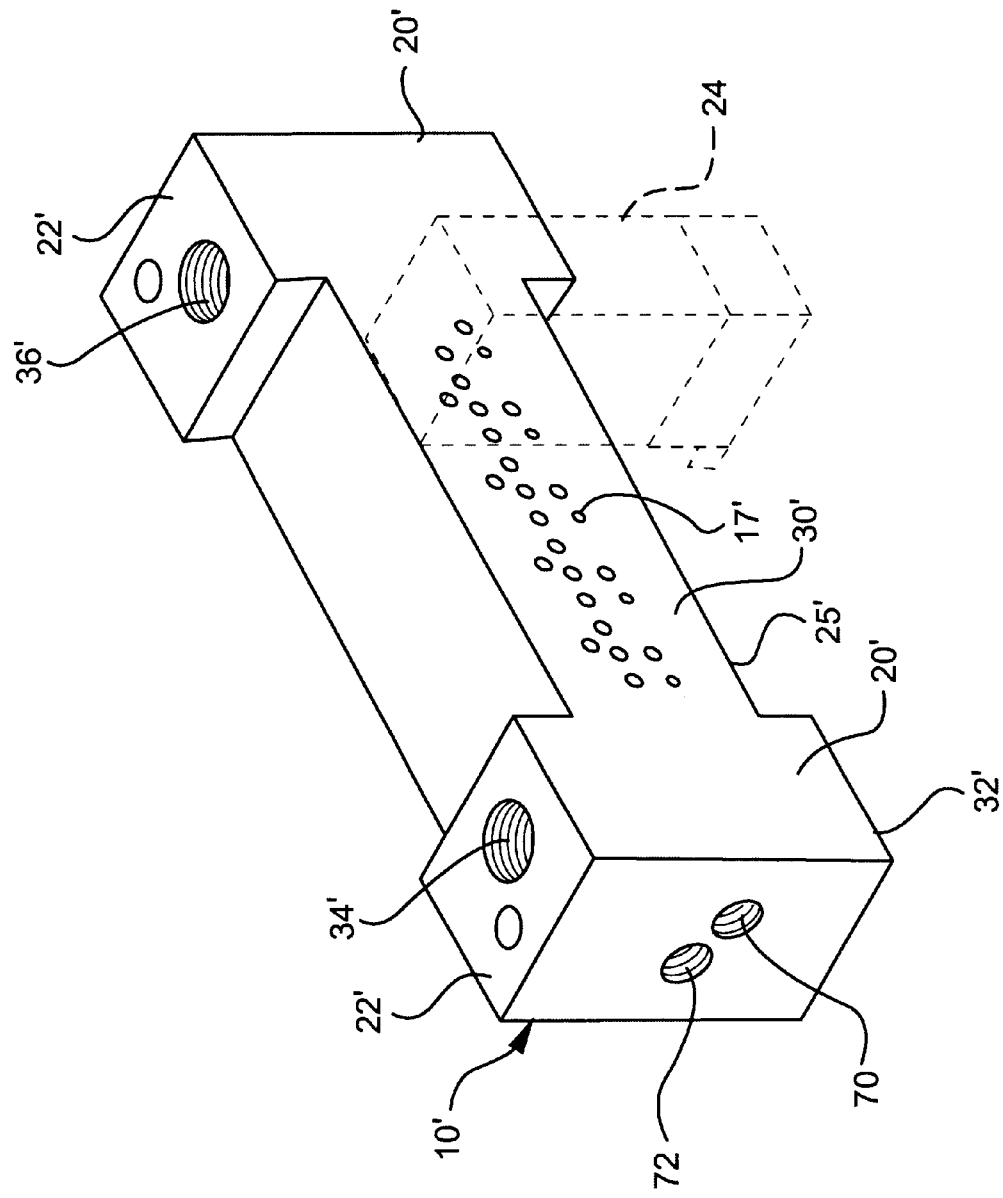
FIG. 8B is a top perspective view of the valve manifold of FIG. 8A.

In another alternative embodiment shown in FIG. 8, a modified manifold 10' may be configured to receive body ported valves such as Festo MHP-... type valves. Manifold 10' would permit vertical stacking and interconnection of the common pressure and exhaust ports. In this embodiment, manifold 10' may be generally an elongate H-shaped member having a central portion 18' extending between end posts 20'. Central portion 18' may include a front face 30' which is generally perpendicular to the upper 22' and lower 32' surfaces of manifold 10'. Common pressure ports may extend through posts 20' between the upper and lower surfaces as in the previously described manifold embodiment shown in FIG. 4. Front face 30' of manifold 10' may include a plurality of valve stations 17' adapted to receive the plurality of valves 24'. Valves 24' may be secured by fasteners to the front face 30' of manifold 10'. The working ports 28' located on the valves would then be exposed and securable to fittings and tubing in a manner well-known in the art. Common connection ports for pressure and exhaust 70 and 72, respectively, may be formed on the end of manifolds 10'.

The manifolds of this embodiment may be vertically stacked. In order to connect manifold 10a' and 10b' together pneumatically, common pressure and exhaust ports may be formed on the manifold upper 22' and lower 32' surfaces. Therefore, a pressure port 34' on the top surface of manifold 10a' aligns with a pressure port 34' on the lower surface on manifold 10b' and an exhaust port 36' on the top surface of manifold 10a' aligns with an exhaust port 36' on the lower surface on manifold 10b'. The solenoids 24b' may be secured to the printed circuit board 12 by a right angle connector 66. The space created beneath central portion 18' and between posts 20' provides a recess 25' for solenoids 24b' to be attached to connector 66. Sealing devices such as coupling 38 described with reference to the previous embodiment or other seal may be positioned between the aligned ports of the stacked manifolds to provide the pneumatic connection. Fasteners (not shown) may be used to physically secure the manifolds together. By placing valves 24' on manifold front face 30', any individual valve 24' may be easily removed from manifolds 10a' and 10b' without having to disassemble the stacked manifolds. Accordingly, valve maintenance can be easily performed.

Figure 9:
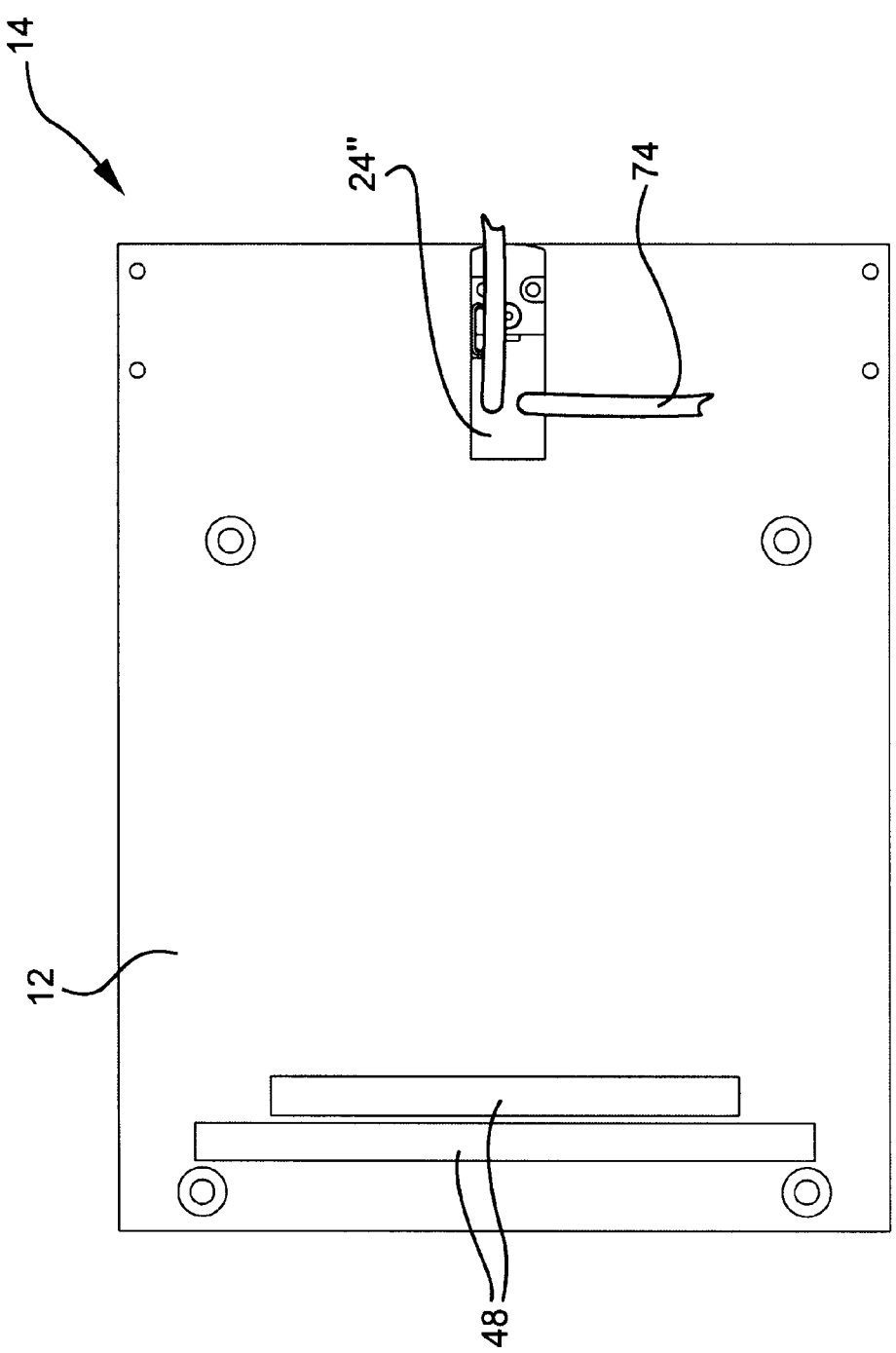
FIG. 9 is a top plan view of an alternative embodiment of an electro-pneumatic module of the present invention.

It is also within the contemplation of the present invention that an individual valve or valves may be secured to a circuit board 12 conforming to the PC/104 standard in order to provide an electro-pneumatic module 14, as shown in FIG. 9. In the case of an individual valve, the valve 24" may be body-ported to permit attachment of pressure, exhaust and output pressure lines 74. Valves mounted on standard non-stackable manifolds of the type known in the art, may also be mounted to a PC/104 conforming circuit board. Even without the stackable manifold 10, one can still obtain the advantages of having pneumatic outputs generated by a PC/104 compatible module which can be combined with a variety of other modules or circuit boards to form a system.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A stackable valve manifold arrangement comprising:
   a first valve manifold adapted to operatively receive a plurality of valves along a length thereof, the first valve manifold having a top portion extending longitudinally along the length of the first manifold, the top portion including an upper surface and a valve base including a plurality of valve stations for accommodating the plurality of valves; and
   a second valve manifold having a longitudinally extending top portion adapted to operatively receive a plurality of valves along a length thereof, the second valve manifold having a longitudinally extending lower surface, the second valve manifold being connected to the first valve manifold such that the lower surface of the second manifold is in opposed relationship to the top surface of the first valve manifold and the first manifold is in fluid communication with the second manifold.

2. The manifold arrangement as defined in claim 1, wherein the first and second manifolds each have a port formed therein and the port of the first manifold aligns with the port of the second manifold to provide fluid communication between the first and second manifolds.

3. The manifold arrangement as defined in claim 1, wherein the upper surface of the first valve manifold and the lower surface of the second valve manifold each include a pressure port which are both operatively connected together.

4. The manifold arrangement as defined in claim 3, wherein the upper surface of the first manifold and the lower surface of the second manifold each include an exhaust port which are operatively connected together.

5. The manifold arrangement as defined in claim 1, wherein the top portion of the first and second valve manifolds each include a recess for accommodating the plurality of valves.

6. The manifold arrangement as defined in claim 5, wherein the recess is defined by the longitudinally extending valve base bounded by a pair of upstanding posts, the posts forming the upper surface of the manifold.

7. The manifold arrangement as defined in claim 6, wherein the first and second valve manifolds having a front face having working ports fluidly connected to the valve stations.

8. The manifold arrangement as defined in claim 1, further including a coupling extending between the upper surface of the first valve manifold and the lower surface of the second valve manifold for providing a sealed fluid connection between the first and second manifolds.

9. The manifold arrangement as defined in claim 1, wherein at least one of the first and second valve manifolds is secured to a printed circuit board.

10. The manifold arrangement as defined in claim 1, wherein the first and second valve manifolds include a front face and the front faces include a plurality of working ports for connecting the plurality of valve stations to a plurality of actuators.

11. The manifold arrangement as defined in claim 8, wherein at least one of the first and second valve manifolds includes a side edge having a port operatively connected to a pressure source for supplying pressure to each of the valve stations.

12. The manifold arrangement as defined in claim 1, wherein the first manifold is longitudinally coextensive with the second manifold.

13. The manifold arrangement as defined in claim 1, wherein the second manifold includes a plurality of discrete valve stations extending along the length of the second valve station.

14. The manifold arrangement as defined in claim 1, wherein the first manifold is secured to a first printed circuit board, and the second manifold is secured to a second printed circuit board, the second circuit board being in opposed spaced relationship to the first circuit board.

15. The manifold arrangement as defined in claim 14, wherein the first manifold is secured on top of the first circuit board and the second manifold is secured on top of the second circuit board and said second circuit board include a clearance for a coupling to extending between the top surface of the first manifold and the bottom surface of the second manifold.

16. A stackable valve manifold arrangement comprising:
   a first longitudinally extending valve manifold having an top portion including a plurality of valve stations adapted to operatively receive a plurality of valves;
   a first circuit board secured to the first valve manifold forming a first module;
   a second longitudinally extending valve manifold adapted to operatively receive a plurality of valves, the second valve manifold having a lower surface; and
   a second circuit board secured to the second valve manifold forming a second module, the second module being positioned above and opposed from the first circuit board and supported on the top portion of the first manifold, and the first module being in electrical and fluid communication with the second module.

17. The valve manifold arrangement as defined in claim 16, wherein the upper surface of the first manifold includes at least one first port that is adapted to be in fluid communication with the plurality of valves, and the lower surface of the second manifold has at least one second port that is adapted to be in fluid communication with the plurality of valves, and the first port is aligned with the second port and connected thereto.

18. The valve manifold arrangement as defined in claim 16, wherein the first and second circuit boards include a plurality of valve connectors adapted for electrically connecting to the plurality of valves.

19. The valve manifold arrangement as defined in claim 16, wherein the first and second modules are bus compatible.

20. The valve manifold arrangement as defined in claim 19, wherein the first and second modules are PC/104 bus compatible.

21. The valve manifold arrangement as defined in claim 19, wherein the first and second circuit boards include a bus connector connectable to a bus and a valve actuation circuit for generating valve actuating signals from information received from the bus.

22. The valve manifold arrangement as defined in claim 21, wherein the valve actuation circuit includes a port address decoder and a current driver.

23. The valve manifold arrangement as defined in claim 21, wherein data for solenoid control is decoded from the data bus.

24. The valve manifold arrangement as defined in claim 19, further including a third circuit board disposed in spaced relationship with one of the first and second circuit boards and electrically connected thereto.

25. The valve manifold arrangement as defined in claim 24, wherein the third circuit board including a microprocessor adapted to receive input signals and generate output signals.

26. The valve manifold arrangement as defined in claim 16, further including a bridge connector extending between the first and second circuit boards to provide electrical connection there between.

27. An electro-pneumatic vertically stackable system comprising:
a first longitudinally extending valve manifold adapted to operatively receive a plurality of valves, the first valve manifold having an upper surface;
a PC/104 compatible first circuit board secured to the first valve manifold forming a first module;
a second longitudinally extending valve manifold adapted to operatively receive a plurality of valves;
a PC/104 compatible second circuit board secured to the second valve manifold forming a second module, wherein the second valve manifold is supported from below by the first valve manifold and is in fluid communication therewith; and
a PC/104 compatible CPU board forming a third module being positioned adjacent to and secured to one of the first and second modules and in electrical communication with the first and second modules, the third module generating signals to drive the plurality of valves.

28. The system as defined in claim 27, wherein the first, second and third modules are connected to each other in a vertically stacked arrangement.

29. A stackable valve manifold arrangement comprising:
a first and second valve manifold adapted to operatively receive a plurality of valves along a length thereof, the first and second valve manifolds having a top portion, a bottom surface and a front face extending longitudinally along the length of thereof, the front face is generally perpendicular to the top portion, the second manifold being stacked on top of the first manifold and in fluid communication therewith,
the front face of the first and second manifolds include a plurality of valves stations adapted to receive the plurality of valves, and wherein the first and second manifolds are adapted to have the plurality of valves secured to and removed there from without separating the first manifold from the second manifold, and wherein the lower surface of the first and second manifolds defining a recess for accommodating electrical connectors for the plurality of valves.

30. The manifold arrangement as defined in claim 29, wherein the first and second manifolds have an H-shaped configuration.

31. The manifold arrangement as defined in claim 29, wherein the first manifold is secured to a first circuit board and the second manifolds is secured to a second circuit board, the first circuit board being in opposed spaced relation to the second circuit board and being operatively connected thereto.

* * * * *